United States Patent
Erickson et al.

(10) Patent No.: US 10,635,154 B2
(45) Date of Patent: Apr. 28, 2020

(54) INTELLIGENT SAS PHY POWER MANAGEMENT

(71) Applicant: Western Digital Technologies, Inc., Irvine, CA (US)

(72) Inventors: Mark David Erickson, Mantorville, MN (US); Darin Edward Gerhart, Oronoco, MN (US); Nicholas Edward Ortmeier, Rochester, MN (US); Yasunobu Suginaka, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 197 days.

(21) Appl. No.: 15/383,047

(22) Filed: Dec. 19, 2016

(65) Prior Publication Data

US 2018/0173293 A1    Jun. 21, 2018

(51) Int. Cl.
  *G06F 1/32* (2019.01)
  *G06F 1/3234* (2019.01)

(52) U.S. Cl.
  CPC .......... *G06F 1/3234* (2013.01); *G06F 1/3268* (2013.01)

(58) Field of Classification Search
  None
  See application file for complete search history.

(56) References Cited

U.S. PATENT DOCUMENTS

| | | | |
|---|---|---|---|
| 7,673,185 B2 | 3/2010 | Kalwitz et al. | |
| 7,912,995 B1 | 3/2011 | Long et al. | |
| 8,843,666 B2 | 9/2014 | Besmer et al. | |
| 8,924,751 B2 | 12/2014 | Myrah et al. | |
| 8,959,374 B2 | 2/2015 | Miller et al. | |
| 2007/0093124 A1* | 4/2007 | Varney | G06F 11/3409 439/499 |
| 2008/0022041 A1* | 1/2008 | Nakajima | G06F 11/004 711/114 |
| 2009/0187779 A1* | 7/2009 | Liu | G06F 1/3221 713/323 |
| 2013/0007480 A1* | 1/2013 | Wertheimer | G06F 1/3203 713/310 |

(Continued)

OTHER PUBLICATIONS

Technical White Paper; HP Smart Storage for HP ProLiant Gen9 Servers; dated 2014; 12 total pages.

*Primary Examiner* — Fahmida Rahman
(74) *Attorney, Agent, or Firm* — Patterson & Sheridan, LLP; Steven H. VerSteeg (57) ABSTRACT

The present disclosure generally relates to a method for intelligent device initiated SAS Phy PM. Using device internal phy characteristics and future phy usage queue, the device determines optimal SAS Phy PM usage based on a predetermined configuration preference of power versus performance. The device achieves optimal SAS Phy PM Usage by implementing a state machine to manage phy PM states and transitions between the PM states. The device state machine includes capabilities to proactively initiate transitions to partial or slumber PM states, start early wake-up from partial or slumber PM states to mask the associated latency impacts of exiting partial or slumber PM states, and selectively reject host requests to enter a partial or slumber PM state.

29 Claims, 4 Drawing Sheets

(56) References Cited

U.S. PATENT DOCUMENTS

| | | | |
|---|---|---|---|
| 2014/0040640 A1* | 2/2014 | Myrah | G06F 3/0625 713/300 |
| 2015/0006814 A1 | 1/2015 | Phong et al. | |
| 2017/0255414 A1 | 9/2017 | Gerhart et al. | |

* cited by examiner

INTELLIGENT SAS PHY POWER MANAGEMENT

BACKGROUND OF THE DISCLOSURE

Field of the Disclosure

Embodiments of the present disclosure generally relate to a method for intelligent device initiated SAS phy power management (PM).

Description of the Related Art

Host computing devices communicate with storage devices through a port on the storage device. The port includes one or more physical layers, which are known as phys. The physical layers are circuitry that implement the physical layer functions. With storage devices using a SAS interface, narrow ports have a single phy while wide ports have two or more phys. The phys physically couple to other phys through a physical link, such as an optical fiber or copper cable. The phys perform various functions on various signals received over the physical link for the port.

The host device does not have any visibility to the specific device's phy usage timings or selection in a wide port. Typically, the same phy that sends the initial signal from the host to the associated storage device is used to perform the host requested operation. For a wide port device, there are thus multiple phys that may not be used to perform the requested operation.

With a wide port, it could easily be the case that the phy that sends the initial signal is not the best phy to handle the requested operation. Further, there are multiple operations that may need to be performed and thus if the same phy that receives the initial signal also handles the requested operation, the storage device may not be operating at peak efficiency.

Therefore, there is a need in the art for an intelligent SAS phy PM that ensures the best phy to perform the operation is selected.

SUMMARY OF THE DISCLOSURE

The present disclosure generally relates to a method for intelligent device initiated SAS Phy PM. Using device internal phy characteristics and future phy usage queue, the device determines optimal SAS Phy PM usage based on a preselected configuration preference of power versus performance. The device achieves optimal SAS Phy PM usage by implementing a state machine to manage phy PM states and transitions between the PM states. The device state machine includes capabilities to proactively initiate transitions to partial or slumber PM states, start early wake-up from partial or slumber PM states to mask the associated latency impacts of exiting partial or slumber PM states, and selectively reject host requests to enter a partial or slumber PM state.

In one embodiment, a phy management method comprises loading state information for a selected phy into a SAS Phy Power Governor (SPPG); calculating Phy Expected Access Time (PhyEAT) and Acceptable PM Latency (APML) for the selected phy; and changing a phy state of the selected phy.

In another embodiment, a data storage device comprises a wide port having a plurality of phys and a controller. The controller is coupled to the plurality of phys, wherein the controller has: a DMA Mux that is coupled to each phy of the plurality of phys; a DMA engine queue coupled to the DMA Mux; a SAS phy DMA scheduler coupled to the DMA engine queue; a SPPG coupled to each phy of the plurality of phys and to the SAS phy DMA scheduler; and a memory manager coupled to the DMA engine queue. The storage device also comprises one or more memory devices coupled to the controller.

In another embodiment, a non-transitory computer readable storage medium containing instructions, that when executed, performs the following method: loading state information for a selected phy into a SPPG; calculating PhyEAT and APML for the selected phy; and changing a phy state of the selected phy.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The present disclosure generally relates to a method for intelligent device initiated SAS Phy PM. Using device internal phy characteristics and future phy usage queue, the device determines optimal SAS Phy PM usage based on a predetermined configuration preference of power versus performance. The device achieves optimal SAS Phy PM usage by implementing a state machine to manage phy PM states and transitions between the PM states. The device state machine includes capabilities to proactively initiate transitions to partial or slumber PM states, start early wake-up from partial or slumber PM states to mask the associated latency impacts of exiting partial or slumber PM states, and selectively reject host requests to enter a partial or slumber PM state.

Figure 1A:
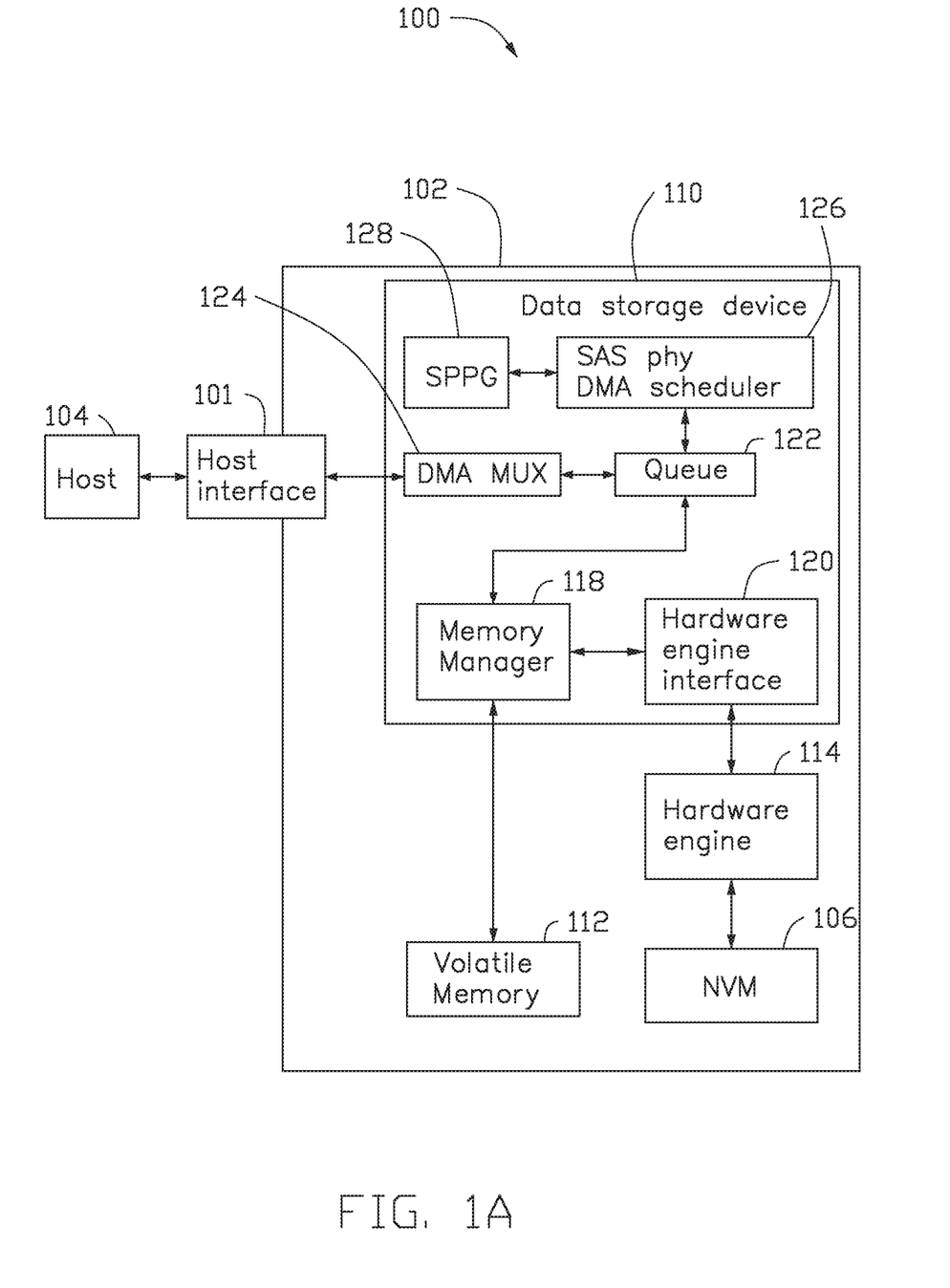
FIG. 1A is a schematic illustration of a system according to one embodiment.

FIG. 1A is a schematic illustration of a system 100 according to one embodiment. The system 100 includes a data storage device 102 for a host 104. The host 104 may utilize non-volatile memory (NVM) devices included in data storage device 102, such as non-volatile memory 106, to store and retrieve data. In some examples, data storage device 102 may include a plurality of storage devices, which may operate as a storage array. In one embodiment, the system 100 may include a plurality of hard drives configured as a redundant array of inexpensive/independent disks (RAID) that collectively function as a mass storage device for host 104. While techniques of this disclosure generally refer to the system 100 and data storage device 102, techniques described herein may be performed in any storage environment that utilizes a SAS Interface and NVM to store data, such as a solid state drive (SSD) or a tape drive.

Figure 1B:
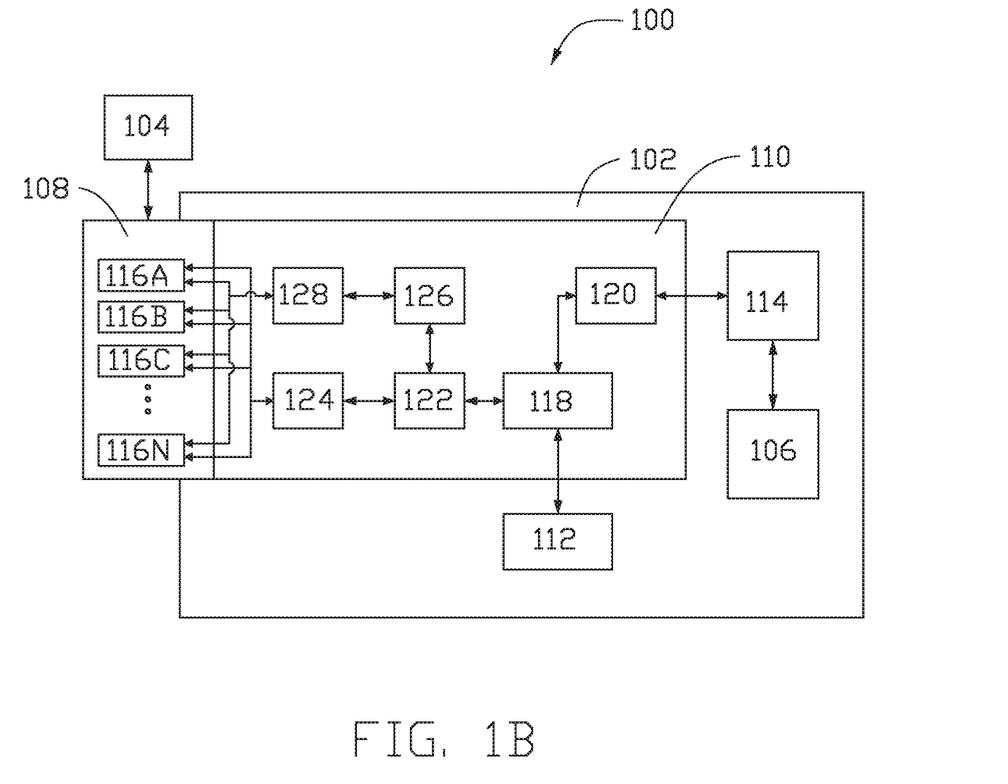
FIG. 1B is a schematic illustration of the system of FIG. 1A utilizing a port for the host interface.

The system 100 includes a host 104, which may store and/or retrieve data to and/or from one or more data storage devices, such as data storage device 102. As shown in FIG. 1A, the host 104 communicates with the data storage device 102 using a host interface 101. The host interface 101 may include various types of interfaces such as PATA, parallel SCSI, or ports such as ports defined in Serial Attached SCSI (SAS) or Fibre Channel Arbitrated Loop (FCAL) Interfaces. As illustrated in FIG. 1B, the host 104 may communicate with data storage device 102 via port 108. Host 104 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, and the like. In one embodiment, host 104 includes any device having a processing unit, which may refer to any form of hardware capable of processing data and may include a general purpose processing unit (such as a central processing unit (CPU)), dedicated hardware (such as an application specific integrated circuit (ASIC)), configurable hardware such as a field programmable gate array (FPGA), or any other form of processing unit configured by way of software instructions, microcode, firmware, or the like.

The data storage device 102 includes a controller 110, a volatile memory 112, a hardware engine 114, NVM 106, and port 108. In some embodiments, data storage device 102 may include additional components not shown in FIGS. 1A and 1B for ease of illustration purposes. For example, data storage device 102 may include power delivery components, including, for example, a capacitor, super capacitor, or battery; a printed circuit board (PCB) to which components of data storage device 102 are mechanically attached and which includes electrically conductive traces that electrically interconnect components of data storage device 102, and the like. In some examples, the physical dimensions and connector configurations of data storage device 102 may conform to one or more standard form factors. Some example standard form factors include, but are not limited to, 3.5" hard disk drive (HDD) or solid state drive (SSD), 2.5" HDD or SSD, or 1.8" HDD or SSD.

In some embodiments, volatile memory 112 may store information for processing during operation of data storage device 102. In some embodiments, volatile memory 112 is a temporary memory, meaning that a primary purpose of volatile memory 112 is not long-term storage. Volatile memory 112 on data storage device 102 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, data storage device 102 may be a shingle magnetic recording (SMR) drive. With SMR, tracks are written to NVM 106 and successively written data tracks partially overlap the previously written data tracks, which typically increases the data density of NVM 106 by packing the tracks closer together. In some examples in which data storage device 102 is an SMR drive, data storage device 102 may also include portions of NVM 106 that do not include partially overlapping data tracks and are thus configured to facilitate random writing and reading of data. To accommodate the random access zones, portions of NVM 106 may have tracks spaced farther apart than in the sequential, SMR zone.

NVM 106 may be configured to store larger amounts of information than volatile memory 112. NVM 106 may further be configured for long-term storage of information as non-volatile memory space and retain information after power on/off cycles. Examples of non-volatile memories include magnetic media, NAND, optical disks, floppy disks, flash memories, or forms of electrically programmable read only memories (EPROM) or electrically erasable programmable read only memories (EEPROM). NVM 106 may be one or more magnetic platters in data storage device 102, each platter containing one or more regions of one or more tracks of data.

Data storage device 102 may include port 108 for interfacing with host 104. Port 108 may include one or both of a data bus for exchanging data with host 104 and a control bus for exchanging operations with host 104. Port 108 may include multiple independent physical connections with host 104, also known as phys 116A-116N. In some examples, port 108 may include as few as a single phy 116A (i.e., a narrow port). Configurations where multiple phys 116A-116N are present are considered to be wide ports. In other examples, port 108 may include four phys 116A-116D. In still other examples, port 108 may include more than four phys 116A-116N. Port 108 may operate in accordance with any suitable protocol. As noted above, the port 108 shown in FIG. 1B is but one embodiment for the host interface 101. The host interface 101 may operate in accordance with one or more of the following protocols: advanced technology attachment (ATA) (e.g., serial-ATA (SATA), and parallel-ATA (PATA)), Fibre Channel Arbitrated Loop (FCAL), small computer system interface (SCSI), serially attached SCSI (SAS), peripheral component interconnect (PCI), PCI-express (PCIe), and non-volatile memory express (NVMe). In the following examples, port 108 may have a wide port configuration and operate in accordance with the SAS protocol. Phys 116A-116N is electrically connected to controller 110, providing electrical connection between host 104 and controller 110, allowing data to be exchanged between host 104 and controller 110. It is to be understood that the phys 116A-116N are a part of the controller 110 and partitioned as a sub-block for internal logic of the controller 110, but for ease of understanding, have been shown explicitly as elements connected to the controller. In some examples, the electrical connection of port 108 may also permit data storage device 102 to receive power from host 104 through the one or more phys 116A-116N, or physical layers that refer to circuitry required to implement physical layer functions. For instance, phys 116A-116N may physically receive a physical interconnection device, such as an optical fiber or copper cable, which may also be connected to host 104 on the other end of physical interconnection device, and perform various functions on the signals received over the physical interconnection devices for port 108.

In FIGS. 1A and 1B, data storage device 102 includes hardware engine 114, which may represent the hardware responsible for interfacing with the NVM 106. Hardware engine 114 may, in the context of a platter-based hard drive such as an SMR drive, represent the magnetic read/write head and the accompanying hardware to configure, drive, and process the signals sensed by the magnetic read/write head. In other examples, such as when data storage device 102 is an SSD or other instances of an HDD, hardware engine 114 may refer to logic engines controlling read and write operations to NVM 106. In such examples, hardware engine 114 may be a sub-component of controller 110. In one embodiment, the controller 110 includes the memory manager 118, hardware engine interface 120, queue 122, DMA mux 124, SAS phy DMA scheduler 126 and SPPG 128. It is to be understood that the controller 110 is not limited to having the components shown in FIGS. 1A and 1B, but rather, may have additional components (such as a hardware engine 114 and volatile memory 112) or less components.

Data storage device 102 includes controller 110, which may manage one or more operations of data storage device 102. Controller 110 may interface with host 104 via port 108 and manage the storage of data to and the retrieval of data from NVM 106 accessible via hardware engine 114. Controller 110 may, as one example, manage writes to and reads from the memory devices, e.g., volatile memory 112 and NVM 106. In some examples, controller 110 may be a hardware controller. In other examples, controller 110 may be implemented into data storage device 102 as a software controller. Controller 110 may include any combination of software, hardware, and/or firmware to perform techniques of this disclosure.

Data storage device 102 may execute software, such as an operating system, to manage interactions between host 104 and hardware engine 114. The operating system may perform arbitration in the context of multi-core CPUs, where each core effectively represents a different CPU, to determine which of the CPUs may access hardware engine 114. The operating system may also perform queue management within the context of a single CPU to address how various events, such as read and write requests in the example of data storage device 102, issued by host 104 should be processed by hardware engine 114 of data storage device 102.

In accordance with the techniques of this disclosure, port 108 may be configured to receive, via phy 116A, a signal. In some examples, the signal may include or be associated with an operation to be performed by one of phys 116A-116N. In the example of FIG. 1B, phy 116A may receive a signal from host 104 that includes a request to conduct a data transfer between data storage device 102 and host 104. Other examples of the signal received at phy 116A may include a signal that includes data to be written at data storage device 102 or a signal that includes an address of data to be read from data storage device 102, among other things. Examples of operations that may be performed by one of phys 116A-116N include a write operation, a read operation, a data transfer, or a data deletion, among other things.

For SAS wide port configurations of a plurality of phys 116A-116N, the controller selects a phy 116A-116N to perform an operation. Initially, a first phy 116A receives a signal. The controller 110 then selects a second phy 116B to perform the operation associated with the signal. The controller makes the selection based on either a respective power factor associated with each respective phy of the plurality of phys 116A-116N and/or a respective performance factor associated with each respective phy of the plurality of phys 116A-116N. In the example of FIG. 1B, phy 116A may receive a signal indicative of an operation to perform a data transfer between data storage device 102 and host 104. In response to receiving the signal, one phy of the phys 116A-116N may perform that operation. However, due to previously queued operations and power states of the various phys 116A-116N, the operation may be performed more efficiently on some phys of the plurality of phys 116A-116N than others. Further, based on the environment in which data storage device 102 is performing in, controller 110 may be configured to operate at a specific level of power efficiency and/or a specific level of performance efficiency. These levels may influence the values of the respective power factors and the respective performance factors used by controller 110 to select each of the one or more phys 116A-116N being used to carry out an operation.

For instance, if data storage device 102 is configured to be a low-power storage device, controller 110 may select the second phy 116B based on which phy 116A-116N would require the least amount of power consumption to execute the operation indicated by the received signal. In another instance, if data storage device 102 is configured to operate in a high-traffic environment, controller 110 may select the second phy 116B based on which phy 116A-116N would complete the operation the quickest or in the shortest amount of time. In still other instances, controller 110 may select the phy 116A-116N based on a combination of the power consumption and the performance efficiency. In the example of FIG. 1B, controller 110 may select phy 116B to perform the data transfer included in the received signal, based on the respective power factor and the respective performance factor of phy 116B indicating that phy 116B was the optimal phy within the plurality of phys 116A-116N for performing the operation under the current configuration of data storage device 102.

Once controller 110 selects second phy 116B to perform the operation, port 108 may perform, using second phy 116B, the operation associated with the received signal. It is again noted that the signal may not have been received by the second phy 116B. In the example of FIG. 1B, phy 116B may perform the operation of conducting the data transfer indicated in the signal received by phy 116A.

The embodiments discussed herein relate to intelligent device initiated SAS phy PM by managing phy PM states and transitions between PM states. Before managing the PM states, data storage device 102 may intelligently decide which phy of the plurality of phys 116A-116N to utilize in performing operations based on the environment in which data storage device 102 is configured to operate. As host 104 may be generally unaware of operations being performed on data storage device 102 without querying data storage device 102, host 104 may arbitrarily determine which phy of the plurality of phys 116A-116N to utilize in sending a signal indicative of an operation to be performed to data storage device 102. If the same phy is consistently used when data storage device 102 is configured for performance, performing all operations using the same phy may result in a large loss in performance, as other phys may not execute any operations while the single phy executes each operation. In other instances, if the phy used by host 104 to send operations to data storage device 102 is rotated when data storage device 102 is configured for power efficiency, performing each operation at the phy which the operation was received may result in power inefficiencies and performance delays based on the phys consistently being activated out of sleep mode and being switched back into sleep mode after the operation is executed. Further, if data storage device 102 was required to switch environments, the previous techniques may not allow data storage device 102 to effectively make such a switch. Using the techniques of the current disclosure, data storage device 102 may intelligently and efficiently operate under any combination of performance and power factors independently of host 104. Further, data storage device 102 may alter performance and power levels based on the desired environment without host 104 needing to be aware of such changes, increasing the independence of data storage device 102.

Within the data storage device 102, there is also a memory manager 118 that manages the memory allocation between the NVM 106 and the volatile memory 112. To send the information to be stored in NVM 106, the information is sent through the hardware engine interface 120, which then sends the information to the hardware engine 114 and finally NVM 106. The signals that come through the phys 116A-116N are processed through a direct memory access (DMA) mux 124 which functions as a router for processing the signals to/from the phys 116A-116N and the DMA engine queue 122. The queue 122 functions to order the signals that are incoming and outgoing from/to the phys 116A-116N. The DMA mux 124 routes the signals to/from the appropriate phys 116A-116N.

As noted above, the host 104 does not know which phy 116A-116N is the best phy to utilize and thus plays no part in routing the signals to the data storage device 102 other than simply sending the signals. Routing of the signals in SAS wide port configurations is determined by the SAS phy DMA scheduler 126. The SAS phy DMA scheduler 126 is coupled to the SPPG 128. The SPPG 128 determines which state each phy 116A-116N should be in based upon how signals are routed by the SAS phy DMA scheduler 126 as well as predetermined power versus performance preferences. The SAS phy DMA scheduler 126 determines which phy 116A-116N is the best phy 116A-116N to handle the signals and also determines which phys 116A-116N will soon be needed. The SPPG 128, based upon the knowledge of when the various phys 116A-116N will be needed, manages and transitions the states of the various phys 116A-116N. The SPPG 128 manages the power state transitions for each phy 116A-116N. The SPPG 128 operates by utilizing inputs from the user power versus performance preference, the phy power and wake-up characteristics, and the phy usage queue. The SPPG 128 is a hardware and/or firmware element within the data storage device 102 to make intelligent decisions on power states for individual phys within the system 100.

The SPPG 128 monitors the SAS phy states: active—host phy PM allowed, active—host phy PM rejected, partial power down mode, slumber power down mode, and wake-up. The SPPG 128 also manages SAS phy state transitions: requests partial, requests slumber, negative acknowledgement (NAK) host partial or slumber requests, and request wake-ups.

Figure 2:
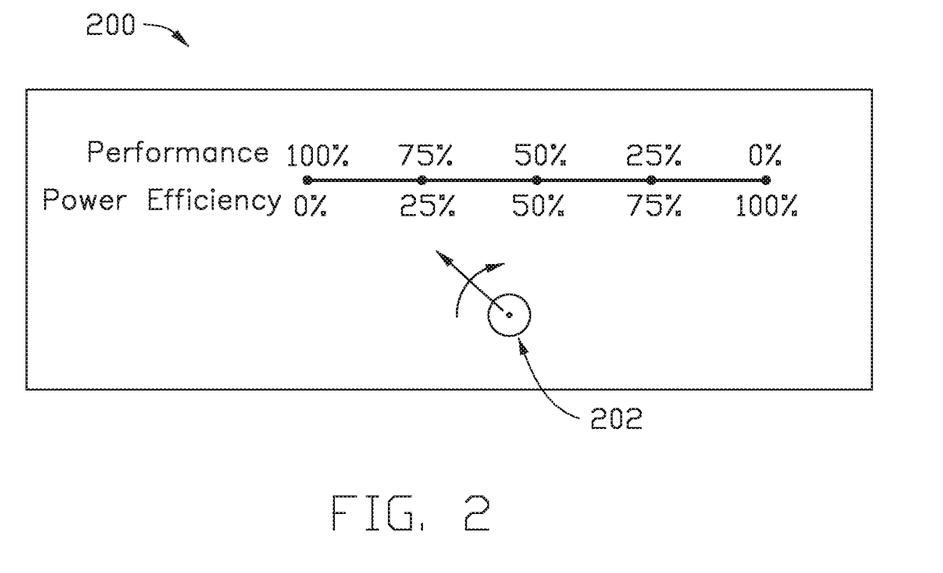
FIG. 2 is a schematic illustration of a user tool for wide port performance power control (WPPPC) according to one embodiment.

FIG. 2 is a schematic illustration of a user tool 200 for WPPPC according to one embodiment. The user provides the power versus performance preference via a WPPPC mode parameter. It is to be understood that the tool 200 is a representation only and that a physical dial 202 is shown for ease of understanding. The WPPPC provides a performance versus power input factor control. The WPPPC is used as an input for both SAS phy usage selection and SAS phy power governor decisions. The control specifies a weight of performance factor versus a power factor in the SPPG algorithms as exemplified by the following examples:

Zero percent power weight and one hundred percent performance weight specifies that the SPPG makes a decision based entirely on the lower latency impacts from PM.

Twenty five percent power weight and seventy five percent performance weight specifies the SPPG uses a twenty five percent weight on lowest power and a seventy five percent weight on lowest latency.

Fifty percent power weight and fifty percent performance weight specifies the SPPG uses equally weighted factors for lowest power and lowest latency.

Seventy five percent power weight and twenty five percent performance weight specifies the SPPG uses a seventy five percent weight on lowest power and a twenty five percent weight on lowest latency.

One hundred percent power weight and zero percent performance weight specifies that the SPPG makes a decision based entirely on the lowest power.

In one embodiment, the control is provided through a user unique mode page byte where the user selects and adjusts the WPPPC settings through a standard mode select command. In another embodiment, there is a static user configuration where the user has unique firmware preference implemented during device fabrication.

The SPPG 128 has the responsibility of actively monitoring the phy states and the system state. The SPPG 128 then requests state transitions as necessary to ensure phys 116A-116N are in the optimal state.

Figure 3:
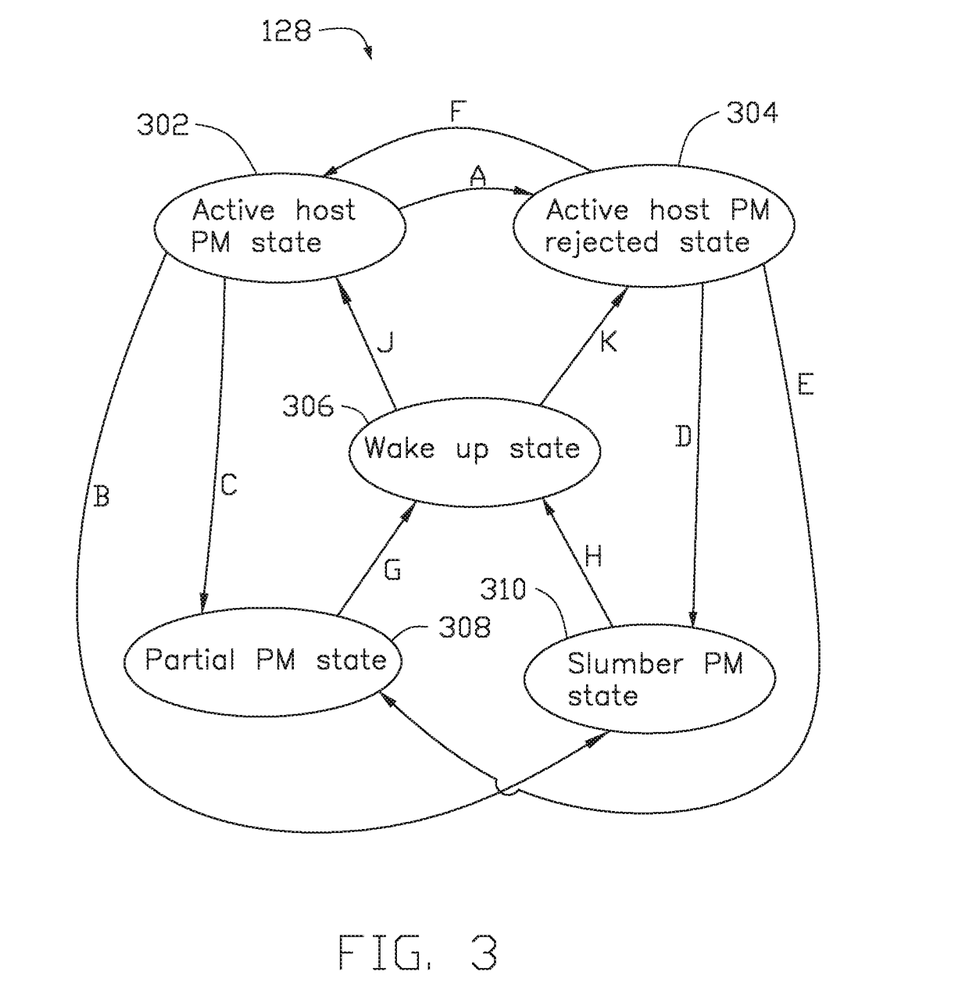
FIG. 3 is a schematic illustration of a SAS phy power governor according to one embodiment.

FIG. 3 is a schematic illustration of a SPPG 128 according to one embodiment. The SPPG 128 has 5 states 302, 304, 306, 308 and 310. State 302 is the active host PM allowed state, and there is no PM related latency or power savings in state 302. In state 302, the host 104 requests to a transition a specific phy 116A-116N to a different PM state and SPPG 128 acknowledges and accepts the transition request. The SPPG 128 determines the phy expected access time (PhyEAT) for phy usage based on the internal statistics of when the system is ready for the next host transfer using the respective phy 116A-116N. The SPPG 128 also determines the acceptable PM latency (APML) based on the user's selected WPPPC (assuming the worst case recovery from slumber). As discussed below, the host 104 sends a signal to a specific phy 116A-116N.

SPPG 128 manages state transitions in the following order: 1) if the PhyEAT is less than APML, then SPPG 128 requests the specific phy 116A-116N to transition to state 304 as shown by arrow "A"; 2) requests slumber PM if PhyEAT+APML is greater than phy slumber wake-up time (i.e., the time needed for the phy to go from the slumber state 310 through the wake up state 306 to either active state 302 or 304) and then requests the specific phy 116A-116N transition to state 310 as shown by arrow "B"; 3) request a partial PM if PhyEAT+APML is greater than phy partial wake-up time (i.e., the time needed for the phy to go from the partial state 308 through the wake up state 306 to either active state 302 or 304) and then requests the specific phy 116A-116N transition to state 308 as shown by arrow "C"; and 4) the phy 116A-116N remains in state 302 for all other cases (e.g., PhyEAT>APML and PhyEAT+APML<phy partial wake-up time).

State 304 is the active host PM rejected state. If the specific phy 116A-116N is in state 304, then the phy 116A-116N is in the active host PM rejected state. State 304 has no PM related latency or power savings and rejects host requests to transition to a PM state. SPPG 128 manages state transitions in the following order: 1) requests slumber PM if PhyEAT+APML is greater than the specific phy 116A-116N slumber wake-up time and then requests a transition for the specific phy 116A-116N to state 310 as shown by arrow "D"; 2) requests partial PM if PhyEAT+APML is greater than phy partial wake-up time and then requests a transition for the specific phy 116A-116N to state 308 as shown by arrow "E"; 3) allows host PM transition if PhyEAT is greater than APML and then requests a transition for the specific phy 116A-116N to state 302 as shown by arrow "F"; and 4) keeps the specific phy 116A-116N in state 304 for all other cases (e.g., PhyEAT<APML).

State 308 is the partial PM state. If the specific phy 116A-116N is in state 308, then the phy 116A-116N is in the power state that has some PM wake-up latency and some power savings benefits. In state 308, if APML is greater than phy partial wake-up time, then SPPG 128 sets APML to partial wake-up time. If PhyEAT drops below phy partial wake-up time and APML delta, then SPPG 128 requests a transition for the specific phy 116A-116N to state 306 as shown by arrow "G".

State 310 is the slumber PM state. If the specific phy 116A-116N is in state 310, then the phy 116A-116N is in the power state that has the largest PM wake-up latency and most power savings benefit. In state 310, if APML is greater than phy slumber wake-up time, then SPPG 128 sets APML to slumber wake-up time. In state 310, if PhyEAT drops below phy slumber wake-up time and APML delta, then SPPG 128 requests a transition for the specific phy 116A-116N to state 306 as shown by arrow "H".

State 306 is the wake-up state. If the phy 116A-116N is in state 306, then the phy 116A-116N is actively performing transceiver recovery and will soon enter one of the active states. Once transceiver recovery is complete, SPPG 128 determines whether to allow specific phy 116A-116N transition to allow host PM state 302 or prevent host PM state 304. If PhyEAT is greater than APML, then SPPG 128 requests a transition for the specific phy 116A-116N to state 302 as shown by arrow "J". If PhyEAT is less than or equal to APML, then SPPG 128 requests a transition for the specific phy 116A-116N to state 304 as shown by arrow "K".

Figure 4:
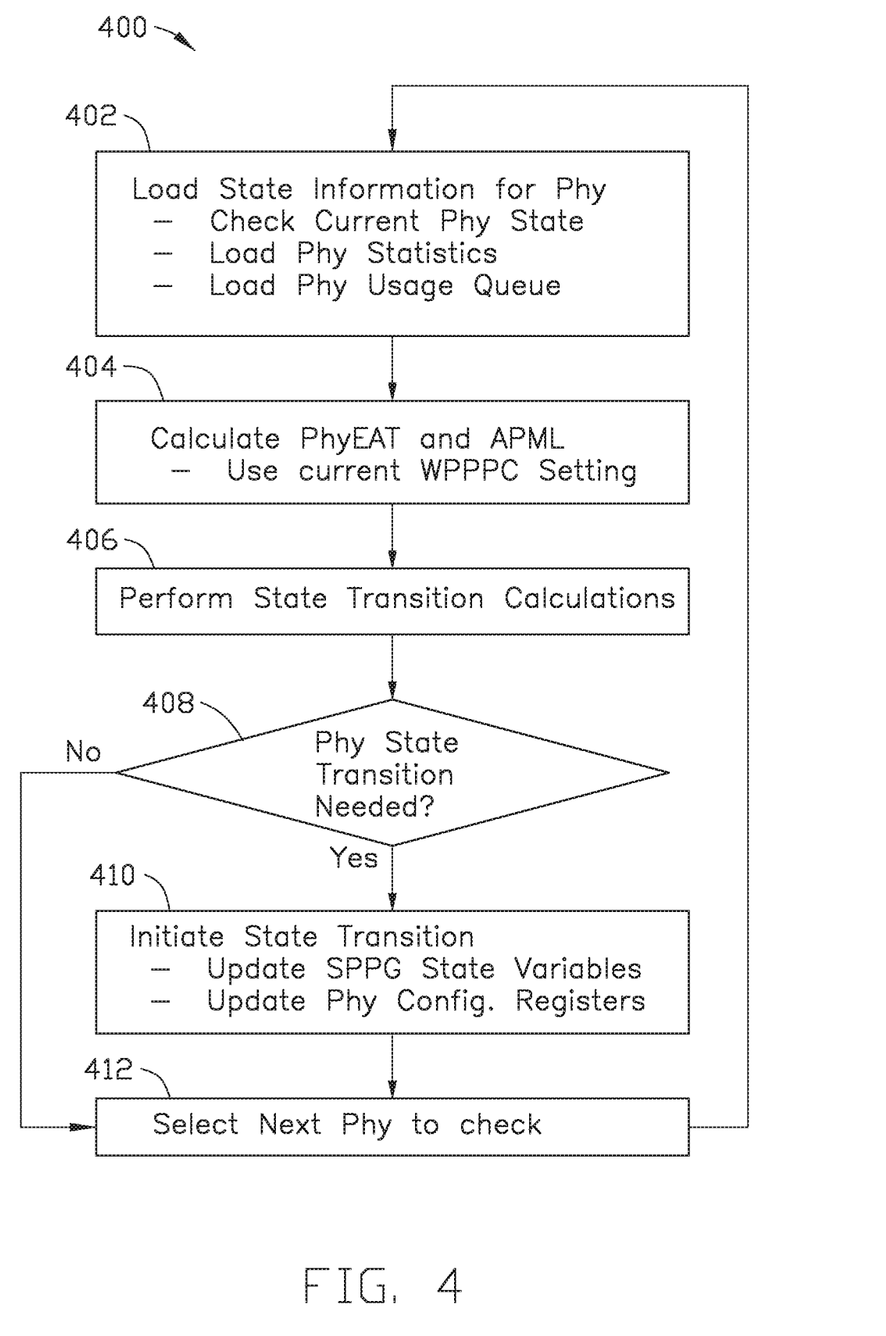
FIG. 4 is a flowchart showing the operation of the SPPG according to one embodiment.

FIG. 4 is a flowchart 400 showing the operation of the SPPG 128 according to one embodiment. Initially, the state information for a selected phy is loaded into the SPPG 128. The current state of the phy is checked and both the phy statistics and phy usage queue are also loaded in block 402. Thereafter, PhyEAT and APML are calculated using the WPPPC setting in block 404. State transition calculations are performed in block 406. Based upon the calculations, a determination is made in block 408 in regards to whether a phy state transition is needed for the selected phy. If a phy state transition is needed, then the state transition is initiated, the SPPG state variables are updated and the phy configuration registers are updated in block 410. Thereafter, the next phy to check is selected in block 412. Once the next phy to check is selected in block 412, then the process repeats back in block 402. If there is no phy state transition needed for the phy in block 408, the next phy to check is selected in block 412.

The SPPG 128 operates by providing optimal SAS phy power usage in devices containing one or more phys. Rather than simply transitioning a selected phy 116A-116N into a new state at the request of the host 104, the host 104 request can be rejected in the interest of avoiding latency impacts due to PM wake-up for the selected phy 116A-116N. The SPPG 128 can also, without a request from a host 104, request entry for a phy 116A-116N into partial power mode if the power benefit is greater than the future command latency impact for the respective phy 116A-116N. Furthermore, the SPPG 128 can also, without a request from a host 104, request entry into slumber power mode for the phy 116A-116N if the power benefit is greater than the future command latency impact for the respective phy 116A-116N. Finally, the SPPG 128 can, without a request from a host 104, transition a phy 116A-116N to initiate early PM wake-up to minimize latency on future command execution for a respective phy 116A-116N.

The SPPG 128 selectively rejects a host-initiated request to enter a SAS Phy power management state. Additionally, the SPPG 128 proactively initiates SAS Phy power management with a host, and selectively times power management wake-up to mask latency impacts from an existing power management state and is pre-programmed with a preselected power versus performance balance. The preselected power versus performance balance is adjustable. In one embodiment, the phy state of a selected phy changes from slumber power management to wake-up, wherein the phy state changes from wake-up to active, wherein the phy state changes from active to partial power management, and/or wherein the phy state changes from active to slumber power management.

The SPPG 128 thus provides an optimal SAS phy PM usage in devices containing multiple phys 116A-116N. The SPPG 128 ensures efficient phy PM usage based on current workload, device phy configuration (e.g., wide port) and user configurations (e.g., WPPPC mode setting). The SPPG 128 provides a mechanism for the data storage device to hide wake-up latency impacts where the user prefers low latency over power savings by initiating early phy wake-up requests so that a phy is active when needed based on the phy usage queue and rejects host initiated PM request based on future work in the phy usage queue. The SPPG 128 provides simple single control for users to select optimization preferences (e.g., performance versus power) for SAS phy power management. The SPPG 128 expands usage of an existing mode page control and the interface allows for either static or dynamic adjustment. For static adjustment, the default value is configured in user unique firmware at the time of fabrication, but in dynamic adjustment, the user adjusts the setting based on the system workload or installation. The SPPG 128 may be implemented in either firmware or hardware or a combination of both.

While the foregoing is directed to embodiments of the present disclosure, other and further embodiments of the disclosure may be devised without departing from the basic scope thereof, and the scope thereof is determined by the claims that follow.

What is claimed is:

1. A SAS phy management method, comprising:
loading state information for a selected SAS phy into a SAS Phy Power Governor (SPPG) within a data storage device that is coupled to a host device, the selected SAS phy is in a SAS port of the data storage device;

calculating Phy Expected Access Time (PhyEAT) and Acceptable Power Management Latency (APML) for the selected SAS phy within the data storage device based on the loaded state information; and changing a phy state of the selected SAS phy based upon the calculated Phy Expected Access Time and the calculated Acceptable Power Management Latency without a request from the host device, wherein the SPPG selectively rejects a host-initiated request from the host device to enter a SAS Phy power management state based on a future command latency impact for the selected SAS phy.

2. The method of claim 1, wherein the SPPG proactively initiates SAS Phy power management with the host device.

3. The method of claim 2, wherein the SPPG selectively times power management wake-up to mask latency impacts from exiting a power management state.

4. The method of claim 1, wherein the SPPG is pre-programmed with a preselected power versus performance balance.

5. The method of claim 4, wherein the preselected power versus performance balance is adjustable.

6. The method of claim 1, wherein the phy state changes from partial power management to wake-up prior to the selected phy being used by a SAS Phy DMA scheduler.

7. The method of claim 1, wherein the phy state changes from slumber power management to wake-up prior to the selected phy being used by a SAS Phy DMA scheduler.

8. The method of claim 1, wherein the phy state changes from wake-up to either active host PM allowed state or active host PM rejected state.

9. The method of claim 1, wherein the phy state changes from active to partial power management.

10. The method of claim 1, wherein the phy state changes from active to slumber power management.

11. The method of claim 1, wherein the Phy Expected Access Time is calculated based on internal statistics of when the storage device is ready for a next host transfer using the selected SAS phy, and wherein the Acceptable Power Management Latency is calculated based on a selected wide port performance power control.

12. The method of claim 1, wherein the storage device comprises a wide port having a plurality of SAS phys, and wherein the storage device is configured to calculate the Phy Expected Access Time and the Acceptable Power Management Latency for each of the plurality of SAS phys.

13. A data storage device, comprising:
a wide port having a plurality of SAS phys;
a controller, wherein the controller is coupled to the plurality of SAS phys, wherein the controller has:
  a DMA Mux that is coupled to each SAS phy of the plurality of SAS phys;
  a DMA engine queue coupled to the DMA Mux;
  a SAS Phy DMA scheduler coupled to the DMA engine queue;
  a SAS Phy Power Governor coupled to each SAS phy of the plurality of SAS phys and to the SAS Phy DMA scheduler, wherein the SAS Phy Power Governor selectively rejects a host-initiated request to enter a SAS Phy power management state based on a future command latency impact for the selected SAS phy; and
  a memory manager coupled to the DMA engine queue; and
one or more memory devices coupled to the controller, wherein the controller is configured to select an individual SAS phy of the plurality of SAS phys based on a respective power factor and an individual performance factor of the individual SAS phy as determined by algorithms in the SAS Phy Power Governor without a request from a host device.

14. A non-transitory computer readable storage medium containing instructions, that when executed, performs the following method:
loading state information for a selected SAS phy into a SAS Phy Power Governor (SPPG) within a data storage device that is coupled to a host device;
calculating Phy Expected Access Time (PhyEAT) and Acceptable Power Management Latency (APML) for the selected SAS phy based on the loaded state information; and
changing a phy state of the selected SAS phy within the data storage device without a request from the host device based on the calculated the PhyEAT and the calculated APML, wherein the SPPG selectively rejects a host-initiated request from the host device to enter a SAS Phy power management state based on a future command latency impact for the selected SAS phy.

15. The storage medium of claim 14, wherein the SPPG proactively initiates SAS Phy power management with the host device.

16. The storage medium of claim 14, wherein the SPPG selectively times power management wake-up to mask latency impacts from exiting a power management state.

17. The storage medium of claim 14, wherein the SPPG is pre-programmed with a preselected power versus performance balance.

18. The storage medium of claim 17, wherein the preselected power versus performance balance is adjustable.

19. The storage medium of claim 14, wherein the phy state changes from partial power management to wake-up prior to the selected phy being used by a SAS Phy DMA scheduler.

20. The storage medium of claim 14, wherein the phy state changes from slumber power management to wake-up prior to the selected phy being used by a SAS Phy DMA scheduler.

21. The storage medium of claim 14, wherein the phy state changes from wake-up to either active host PM allowed state or active host PM rejected state.

22. The storage medium of claim 14, wherein the phy state changes from active to partial power management.

23. The storage medium of claim 14, wherein the phy state changes from active to slumber power management.

24. A data storage device, comprising:
means for loading state information for a selected SAS phy into a SAS Phy Power Governor (SPPG) within the data storage device, wherein the SAS phy is in a port of the data storage device;
means for calculating Phy Expected Access Time (PhyEAT) and Acceptable Power Management Latency (APML) for the selected SAS phy based on the state information loaded by the means for loading; and
means for changing a phy state of the selected SAS phy within the data storage device according to the calculated PhyEAT and the calculated APML for the selected phy without a request from a host device, wherein the SPPG selectively rejects a host-initiated request from the host device to enter a SAS Phy power management state based on a future command latency impact for the selected SAS phy.

25. The device of claim 24, wherein the SPPG has a preselected power versus performance setting, wherein the device further comprises means for adjusting the preselected power versus performance balance.

26. The device of claim 25, further comprising means for communicating between the host device and the data storage device.

27. The device of claim 26, further comprising means for managing volatile and nonvolatile memory in the data storage device.

28. The device of claim 27, further comprising means for routing signals from the host device within the data storage device.

29. The device of claim 28, further comprising means for routing signals from the SPPG to the means for managing volatile and nonvolatile memory.

* * * * *